(12) United States Patent
Mallya et al.

(10) Patent No.: US 9,783,627 B2
(45) Date of Patent: Oct. 10, 2017

(54) REMOVABLE COMPOSITION WITH POLYMER MICROSPHERES

(75) Inventors: Prakash Mallya, Sierra Madre, CA (US); Xiang-Ya Li, San Gabriel, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/984,881

(22) PCT Filed: Jan. 13, 2012

(86) PCT No.: PCT/US2012/021244
§ 371 (c)(1),
(2), (4) Date: Aug. 12, 2013

(87) PCT Pub. No.: WO2012/097253
PCT Pub. Date: Jul. 19, 2012

(65) Prior Publication Data
US 2014/0011953 A1    Jan. 9, 2014

Related U.S. Application Data

(60) Provisional application No. 61/432,760, filed on Jan. 14, 2011.

(51) Int. Cl.
| | | |
|---|---|---|
| C08F 22/18 | (2006.01) | |
| A23G 4/06 | (2006.01) | |
| A23G 4/08 | (2006.01) | |
| C08F 26/06 | (2006.01) | |
| C08F 220/18 | (2006.01) | |
| A23G 4/20 | (2006.01) | |

(52) U.S. Cl.
CPC .............. *C08F 220/18* (2013.01); *A23G 4/06* (2013.01); *A23G 4/08* (2013.01); *A23G 4/20* (2013.01); *C08F 2220/1808* (2013.01)

(58) Field of Classification Search
CPC ........ C08F 220/18; C08F 22/18; C08F 26/06; C08F 26/08; A23G 4/06; A23G 4/08; A23G 4/20
USPC ......... 524/556, 833; 526/263, 264; 525/204, 525/303, 55
See application file for complete search history.

(56) References Cited

U.S. PATENT DOCUMENTS

| | | | |
|---|---|---|---|
| 2,740,772 A * | 4/1956 | Alfrey, Jr. ................ | A23G 4/06 426/1 |
| 3,285,750 A | 11/1966 | Ishida et al. | |
| 4,208,432 A | 6/1980 | Noborio et al. | |
| 4,259,355 A | 3/1981 | Marmo et al. | |
| 4,423,031 A * | 12/1983 | Murui et al. ..................... | 424/63 |
| 4,518,615 A | 5/1985 | Cherukuri et al. | |
| 4,810,763 A * | 3/1989 | Mallya et al. ................ | 526/203 |
| 5,601,858 A | 2/1997 | Mansukhani et al. | |
| 5,656,705 A * | 8/1997 | Mallya .................... | C08F 20/18 526/233 |
| 2006/0153949 A1 | 7/2006 | Gebreselassie et al. | |
| 2007/0042078 A1 | 2/2007 | Miladinov et al. | |
| 2010/0074987 A1 | 3/2010 | Neergaard | |
| 2011/0123672 A1 | 5/2011 | Xia et al. | |

FOREIGN PATENT DOCUMENTS

| | | |
|---|---|---|
| CN | 1931917 | 3/2007 |
| CN | 101698965 A | 4/2010 |
| EP | 1496753 B1 | 6/2007 |
| WO | WO2005/118660 | 12/2005 |
| WO | WO2006/016179 | 2/2006 |
| WO | WO2008/145120 | 12/2008 |
| WO | WO2011057882 | 5/2011 |

OTHER PUBLICATIONS

International Preliminary Report on Patentability issued in corresponding IA No. PCT/US2012/021244 dated Jul. 25, 2013.
International Search Report and Written Opinion issued in corresponding IA No. PCT/US2012/021244 dated May 2, 2012.
International Preliminary Report on Patentability issued in corresponding IA No. PCT/US2012/053311 dated Mar. 4, 2014.
International Search Report and Written Opinion issued in corresponding IA No. PCT/US2012/053311 dated Jan. 31, 2013.
Response to IPRP filed in corresponding EP Application No. 12 759 865.4 dated Oct. 20, 2014.
Goh et al., "Cross-linked Poly(methacrylic acid-co-polyethylene oxide) methyl ether methacrylate) Microspheres and Microgels prepared by Precipitation Polymerization: Morphology Study", Macromolecules, 2002, 35(27), 9983-9989 (STIC Search, pp. 173-175).
Yamauchi et al. "Synthesis and characterization of telechelic multiple hydrogen bonded (MHB) macromolecules via living anionic polymerization", Polymer Preprints (American Chemical Society, Division of Polymer Chemistry)(2002), 43(1), 698-699 (STIC Search, pp. 25-27).

* cited by examiner

*Primary Examiner* — Michael M Bernshteyn
(74) *Attorney, Agent, or Firm* — Avery Dennison Corporation

(57) ABSTRACT

A composition comprising a suspension polymerization product of a mixture of monomers of ethyl hexyl acrylate (EHA) and ethyl methacrylate (EMA) is described. Further, a composition comprising a suspension polymerization product of polar monomers that can be copolymerized with at least one of (meth)acrylic acid esters of alcohols having 4-14 carbon atoms and (meth)acrylic acid esters of alcohols having 1-3 carbon atoms is described.

10 Claims, No Drawings

REMOVABLE COMPOSITION WITH POLYMER MICROSPHERES

CROSS-REFERENCE TO RELATED APPLICATION

The present application claims the benefit of International Application No. PCT/US2012/021244 filed Jan. 13, 2012, which was published in English on Jul. 19, 2012, which claims priority to U.S. Provisional Application No. 61/432,760 filed Jan. 14, 2011, both of which are incorporated herein by reference in their entireties.

FIELD OF THE INVENTION

The present invention relates to polymer synthesis and product formulation. More particularly, the present invention is directed to promoting ease of removability of articles such as used chewing gums.

BACKGROUND OF THE INVENTION

After being used or processed, some articles become sticky. Chewing gum is an example of such an article. After being chewed and without proper disposal, the gum is typically found stuck to sidewalks, building structures, or furniture, for example. Removal of chewed gum from a surface is often difficult, as the gum typically strings and breaks upon peeling off the surface, thereby leaving a portion of the gum on the surface. As a result, the surface must either be cleaned or other efforts undertaken to remove the gum. Improper disposal of used chewing gum has become such a significant environmental issue that certain public places such as schools, and even entire countries, such as Singapore, have banned chewing gum.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to a removable composition comprising polymer microspheres. The invention is also directed to a removable article, such as chewing gum or gum base including the polymer microspheres. The invention is also directed to methods of improving the removability of chewing gum and gum bases. And, the invention is additionally directed to various methods of producing gum bases and chewing gums including the polymer microspheres.

In one embodiment of the current invention, the removable composition comprises the suspension polymerization product of ethyl hexyl acrylate (EHA) and ethyl methacrylate (EMA). In another embodiment of the current invention, the removable composition is used as part of a gum base for chewing gum. In a further embodiment of the current invention, a polymeric article comprises the suspension polymerization product of ethyl hexyl acrylate (EHA) and ethyl methacrylate (EMA).

In another embodiment of the current invention, a composition comprises suspension polymerization product with concentrations:

(i) from about 60 wt % to about 100 wt % of (meth)acrylic acid esters of alcohols having 4-14 carbon atoms;
(ii) from trace amount to about 40 wt % of (meth)acrylic acid esters of alcohols having 1-3 carbon atoms; and
(iii) from about 0 wt % to about 20 wt % of polar monomers that can be copolymerized with at least one of (i) and (ii).

In another embodiment of the current invention, a polymeric article comprises suspension polymerization product with concentrations:

(i) from about 60 wt % to about 100 wt % of (meth)acrylic acid esters of alcohols having 4-14 carbon atoms;
(ii) from trace amount to about 40 wt % of (meth)acrylic acid esters of alcohols having 1-3 carbon atoms; and
(iii) from about 0 wt % to about 20 wt % of polar monomers that can be copolymerized with at least one of (i) and (ii).

In yet another embodiment of the invention, a composition comprises suspension polymerization product of ethyl hexyl acrylate (EHA) and a positive amount, up to about 40 wt % ethyl methacrylate (EMA), and the product is not toxic for human consumption.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

DETAILED DISCUSSION OF THE INVENTION

The compositions and methods disclosed in this document are described in detail by way of examples and with reference to the discussion herein. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of compositions and methods are hereinafter disclosed and described in detail.

The present invention relates to a removable composition comprising polymer microspheres. The microsphere polymers may be synthesized by suspension polymerization of acrylic monomers and other ethylenically polymerizable monomers. Exemplary compositions include from about 60 wt % to about 100 wt % of (meth)acrylic acid esters of alcohols having about 4 to about 14 carbon atoms. Examples of (meth)acrylic acid esters of alcohols having about 4 to about 14 carbon atoms include, but are not limited to ethyl hexyl acrylate (EHA), butyl acrylate (BA), isooctyl acrylate (IOA), lauryl acrylate, isobornyl acrylate, and combinations thereof. The compositions may also include a trace amount, or a positive amount, from about 0 wt % to about 40 wt % of (meth)acrylic acid esters of alcohols having from about 1 to about 3 carbon atoms. Examples of (meth)acrylic acid esters of alcohols having from 1 to 3 carbon atoms include, but are not limited to methyl acrylate (MA), ethyl acrylate (EA), propyl acrylate (PA), methyl methacrylate (MMA), ethyl methacrylate (EMA), and combinations thereof. Additionally, the compositions may also include from about 0 wt % to about 20 wt % of polar monomers that can be copolymerized with the above-noted monomers. Examples of polar monomers include, but are not limited to (meth) acrylic acid, (meth)acrylamide, hydroxyethyl(meth)acrylates, hydroxypropyl(meth)acrylates, di-,tri-,tetra-, and poly-ethylene glycol(meth)acrylates, di-,tri-,tetra-, and poly-propylene glycol(meth)acrylates, (meth)acrylates of copolymers of ethylene glycol and propylene glycol, N,N-dialkylacrylamide, N-vinylpyrrolidone, and combinations thereof.

Generally, the microsphere polymers may contain from about 0 wt % to about 30 wt % of non-polymerizable oligomers and/or polymers which are blended into the monomer mixtures. The oligomers and polymers can be either hydrophobic or hydrophilic in nature. The microspheres may also contain post-added amphiphilic, hydrophilic, or hydrophobic polymers or oligomers to modify the adhesion or removability properties. The polymers or oligomers may be any type of polymer such as, for example, random, graft, and/or block.

The microspheres may additionally contain from about 0 wt % to about 30 wt % of macromonomers such as polyethylene oxide (PEO) acrylate, acrylated ethylene butylenes, acrylated polystyrene, and/or other similar materials that are added with monomers and copolymerized to render the resulting polymers hydrophilic or hydrophobic, and to alter the mechanical and/or adhesive properties of the polymers. In addition to these added macromers, additional tackifiers, plasticizers, and/or other agents compatible with the noted macromers can be added to additionally modify and selectively tailor the properties and characteristics of the polymer microspheres. Furthermore, supplemental plasticizers, tackifiers and the like can be added to further modify and/or enhance the rheological, removability, and/or compatibility properties of the microspheres. This can be performed either prior to polymerization by adding such agents with the monomers of interest or after polymerization.

The suspension polymerizations may be initiated by a free radical initiator. Examples of suitable initiators include, but are not limited to benzoyl peroxide and lauroyl peroxide.

The suspension polymerization systems may also contain a surfactant or a mixture of surfactants and/or a suspension stabilizer. Examples of surfactants and stabilizers are sodium lauryl sulfate, sodium mono- and dimethyl naphthalene sulfonate, polysorbate 60, polysorbate 80, sorbitan monostearate, hydroxypropyl cellulose, methyl ethyl cellulose, pluronics, tetronics, ethylene glycol and/or propylene glycol polymers and copolymers and their mono- or diethers and esters.

Optionally, the polymerization mixtures may contain buffers and/or electrolytes, such as sodium sulfate, monosodium and disodium phosphate, and/or sodium acrylate.

Optionally, the polymerization mixtures may contain chain transfer agents and cross-linking agents. The microspheres have particle sizes in the range of about 5 micron to about 130 micron.

The microsphere polymers may be partially cross-linked and may have gel contents, a measure of insoluble fraction in a given solvent such as tetrahydrofuran (THF) or ethyl acetate, of from about 30 wt % to about 80 wt %. In other words, the microsphere polymers may be partially soluble in a given solvent. It will, however, be appreciated that the present invention may include the use of microsphere polymers having gel contents greater than or less than these amounts.

In one embodiment, the microspheres include a hydrophobic core and a hydrophobic surface. In another embodiment, the microspheres have a hydrophobic core and a hydrophilic surface. The present invention includes other configurations for the microspheres.

For applications in chewing gum or similar products, the composition should be safe for human ingestion if swallowed accidently. Thus, the residual monomer should be minimal, and the polymer should not break down into toxic components, as defined by the United States Food and Drug Administration (U.S.F.D.A.), during the chewing process in a person's mouth or in the digestive system. In one embodiment, the polymer microspheres are synthesized via suspension polymerization of EHA and EMA.

In one embodiment, the microspheres may be produced in the presence of a buffer provided in an amount sufficient to maintain pH of the reaction medium in the range of about 6 to about 9.5, and more preferably of from about 7 to about 8.

The stickiness and removability of the composition may be affected by the glass transition temperature and the dynamic shear storage modulus of the microspheres. When the dynamic shear storage modulus is low, the microspheres are soft and sticky. When the dynamic shear storage modulus is high, the microspheres have improved cohesive strength, yet typically exhibit a greater hardness. The dynamic shear storage modulus, therefore, may be optimized to balance the softness and the cohesive strength of the polymeric material. Additionally, in some embodiments, the glass transition temperature of the microspheres may be from about −70° C. to about −20° C. measured using Differential Scanning Calorimetry. And, the invention may include microspheres exhibiting glass transition temperatures greater than −20° C. or less than −70° C. that satisfy the requirements on stickiness and removability.

The present invention also provides a chewing gum base. The gum base may include a rubber component and the polymer microspheres described herein. The rubber component may include one or more natural latex products typically derived from chicle, and/or various synthetic rubber materials, which may be based upon polyisobutylene. The chewing gum base may be formed in a wide array of methods. In one embodiment, the gum base may be melted to a temperature of about 115° C. and then filtered. The gum base may be further processed by additional filtering and processing such as centrifuging. Once a relatively clear base is obtained, additional ingredients are added. Non-limiting examples of such ingredients include sugar, sweeteners, corn syrup, glucose, softeners, food colorings, flavorings, preservatives, and other agents known in the art. The polymer microspheres may be incorporated into the gum base during addition of one or more of these ingredients. The invention, however, includes a technique in which the microspheres are incorporated either entirely or in some portion thereof in a separate operation after or before addition of the previously noted ingredients.

In one embodiment, the solids content of the present microspheres in water may range from about 20 to about 55 percent by weight. The microspheres may be dried and mixed with the other portion of the gum base through for example, a hot melt process. Again, it will be appreciated that other techniques and strategies may be used for combining or otherwise incorporating the microspheres into a gum base or other product formulation base.

The microspheres should be incorporated in the chewing gum or gum base in an effective amount. The term "effective amount" is used herein to refer to an amount or proportion of the microspheres that would result in the chewing gum or gum base being more easily removable from a surface. The upper limit of the amount or proportion of the microspheres is such that the flavor, chewing characteristics, and/or consumer appeal of the chewing gum are not detrimentally affected. Although not wishing to be bound to any particular amount, typically the microspheres may be used in a chewing gum composition in an amount of from about 1 wt % to about 45 wt %, and in some embodiments from about 5 wt % to about 40 wt %, based upon the total weight of the chewing gum composition. The present invention may include the use of amounts greater than and less than these noted values.

The following example is presented to further illustrate the various embodiments and aspects of the invention. In no way is the present invention limited to any particular aspect of feature as described herein.

Example

A reactor was used to form the microspheres. An impeller having one blade is used. The jacket was disconnected from the bath and the bath is heated to 65° C. 320 grams of deionized water was added to the reaction. Then, 0.79 grams of disodium phosphate (anhydrous) and 3.18 grams of monosodium phosphate (monohydrate) were mixed in the water with nitrogen blanketing. Next, 198 grams of 2-ethyl hexyl acrylate, 52 grams of ethyl methacrylate, and 1.85 grams of lauroyl peroxide was mixed until all components were dissolved. Without agitation, nitrogen was bubbled through the reactor liquid through a Teflon tube for 15 minutes. The tube was then lifted out of the liquid. 31 grams of 10% sodium lauryl sulfate was then added to the mixture and 40 grams of deionized (DI) water was used to rinse the solution. Agitation was then set to 400 rpm. Nitrogen purge was started. A jacket maintained at 65° C. was attached to the reactor. After one hour, the jacket temperature was raised to 75° C. and held for three hours. Next, the jacket temperature was further raised to 85° C. and held for three hours. The jacket was then cooled to below 40° C. The final pH was 7.1, particle size was 33 microns, gel content was 48%, solids content was about 40%, and residual monomer was less than 0.05%. The glass transition temperature of the resulting microspheres was −60° C. measured using Differential Scanning Calorimetry with 5° C./min heating rate. Following polymerization, the water-based suspension may be purified to remove the surfactant and other water soluble moieties by several means such as dialysis, ultrafiltration, or by some other washing and purification technique known in the art.

Gel content was measured according to the following method: about 50 mg of the sample was weighed out onto a pre-weighed 10 micron polypropylene filter paper from Millipore Corporation, Bedford, Mass. The weight of the filter paper W1 and the weight of the sample W2 were recorded. The filter paper was folded into a half-moon shape and heat sealed around the periphery to make a sample pouch, which was then placed in a 22 mL scintillation vial filled with tetrahydrofuran (THF). The vial was tumbled for two days. The sample pouch was then taken out of the vial, rinsed with the same solvent, clam shelled in a metal pan, and placed in a 90° C. oven for 3 hours. The sample was weighed again after the drying and its weight W3 was recorded. The test was repeated three times. Gel content, expressed in wt %, was calculated based on the following formula:

Gel content=$(W3-W1)/W2 \times 100$

All of the features disclosed in the specification, including the claims and abstract, and all of the steps in any method or process disclosed, may be combined in any combination, except combinations where at least some of such features and/or steps are mutually exclusive. Each feature disclosed in the specification, including the claims and abstract, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined by the following claims.

What is claimed is:

1. A chewing gum base composition comprising:
   a rubber component; and
   polymer microspheres formed via suspension polymerization including:
   (i) from about 60 wt % to about 100 wt % of (meth)acrylic acid esters of alcohols having 4-14 carbon atoms;
   (ii) from about 0 wt % to about 40 wt % of (meth)acrylic acid esters of alcohols having 1-3 carbon atoms; and
   (iii) from about 0 wt % to about 20 wt % of polar monomers that are copolymerizable with at least one of (i) and (ii), the polar monomer being selected from the group consisting of (meth)acrylic acid, (meth)acrylamide, hydroxyethyl (meth)acrylates, hydroxypropyl (meth)acrylates, di-,tri-,tetra-,and polyethylene glycol (meth)acrylates, di-,tri-,tetra-,and polypropylene glycol (meth)acrylates, (meth)acrylates of copolymers of ethylene glycol and propylene glycol,N,N-dialkylacrylamide, N-vinylpyrrolidone, and combinations thereof; and
   wherein the polymer microspheres are in an amount of from about 1 wt % to about 45 wt % based upon the total weight of the chewing gum base composition, wherein the polymer microspheres have particle sizes in the range of from about 5 microns to about 130 microns, and wherein the composition has a solids content from about 20 to about 55 percent by weight.

2. The composition of claim 1, wherein the (meth)acrylic acid ester of an alcohol having from 4-14 carbon atoms is selected from the group consisting of ethyl hexyl acrylate (EHA), butyl acrylate (BA), isooctyl acrylate (IOA), lauryl acrylate, isobornyl acrylate, and combinations thereof.

3. The composition of claim 1, wherein the (meth)acrylic acid ester of an alcohol having from 1-3 carbon atoms is selected from the group consisting of methyl acrylate (MA), ethyl acrylate (EA), propyl acrylate (PA), methyl methacrylate (MMA), ethyl methacrylate (EMA), and combinations thereof.

4. The composition of claim 1, wherein the gel content of the polymer microspheres as a measure of insoluble fraction in tetrahydrofuran (THF) or ethylacetate is from about 30 wt % to about 80 wt %.

5. The composition of claim 1, wherein the rubber is selected from the group consisting of natural rubber, synthetic rubber, and combinations thereof.

6. The composition of claim 1, wherein the polymer microspheres are in an amount of from about 5 wt % to about 40 wt % based upon the total weight of the chewing gum base composition.

7. The composition of claim 1, wherein the polymer microspheres further include from about 0 wt % to about 30 wt % of macromonomers, the macromonomers selected from the group consisting of polyethylene oxide (PEO) acrylate, acrylated ethylene butylenes, and acrylated polystyrene.

8. The chewing gum base composition of claim 1, wherein the amount of element (ii) is at least a trace amount.

9. The composition of claim 1, wherein the (meth)acrylic acid ester of an alcohol having from 4-14 carbon atoms is lauryl acrylate.

10. The composition of claim 1, wherein the (meth)acrylic acid ester of an alcohol having from 4-14 carbon atoms is isobornyl acrylate.

* * * * *